(12) United States Patent
Mejouev (10) Patent No.: US 7,983,965 B2
(45) Date of Patent: Jul. 19, 2011

(54) METHOD FOR SELECTING OPTICAL FIBER FOR USE IN FIBER AND CABLE SYSTEMS

(75) Inventor: Igor Rafaelyevich Mejouev, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 572 days.

(21) Appl. No.: 12/072,077

(22) Filed: Feb. 22, 2008

(65) Prior Publication Data
US 2009/0216367 A1 Aug. 27, 2009

(51) Int. Cl.
*G06Q 10/00* (2006.01)
(52) U.S. Cl. .......................................... 705/28; 385/86
(58) Field of Classification Search .............. 385/16, 385/123
See application file for complete search history.

(56) References Cited

U.S. PATENT DOCUMENTS

| | | | |
|---|---|---|---|
| 5,119,307 A | 6/1992 | Blaha et al. | 364/468 |
| 5,689,417 A | 11/1997 | Shockley et al. | 364/401 |
| 5,943,245 A | 8/1999 | Melfi et al. | 364/512 |
| 7,079,735 B2 | 7/2006 | Abbott, III et al. | 385/123 |
| 7,471,858 B2 * | 12/2008 | Guo et al. | 385/16 |
| 2002/0159689 A1 | 10/2002 | Onishi et al. | 385/24 |
| 2003/0147608 A1 * | 8/2003 | Abbott et al. | 385/123 |

FOREIGN PATENT DOCUMENTS

| | | |
|---|---|---|
| EP | 0532388 A1 | 3/1993 |
| EP | 1211826 A2 | 6/2002 |
| WO | WO03/001257 | 1/2003 |
| WO | WO03/052660 | 6/2003 |

OTHER PUBLICATIONS

Logic IC Market & Packages, SMT Trends, p. 1, Sep. 1998.*

* cited by examiner

*Primary Examiner* — Matthew S Gart
*Assistant Examiner* — Russell S Glass
(74) *Attorney, Agent, or Firm* — Matthew J. Mason (57) ABSTRACT

An optical fiber inventory selection system selects optical fibers from inventory for use in a communication network. In one embodiment, the system generates an internal specification of requirements to select optical fiber reels from an inventory to be used as components in spans, such as dispersion managed spans, wherein at least one of the selected optical fiber reels is identified to have an amount of optical fiber on the reel cut back to a reduced length. The spans can then be selected to satisfy customer requirements or standardized requirements for a communication network that may include a plurality of cables and paths.

18 Claims, 3 Drawing Sheets

METHOD FOR SELECTING OPTICAL FIBER FOR USE IN FIBER AND CABLE SYSTEMS

BACKGROUND OF THE INVENTION

1. Field of the Invention

The present invention relates generally to the selection of optical fibers and, more specifically, to the selection of optical fiber reels from inventory to fill an order, such as an order for a cable or a cabled system.

2. Technical Background

When an optical fiber is produced, the optical fiber is generally placed on a reel for storage within a warehouse, prior to shipment to a customer. Before the optical fiber reel is stored in the warehouse, however, various optical parameters of the optical fiber reel are normally recorded. When a customer order is received for optical fibers, optical fiber reels are generally selected so that when the optical fiber reels are assembled into final cabled systems (e.g., submarine cables), customer requirements on the optical specifications may be met at constituent, span, cable, cabled segment, and cabled system levels. For example, a customer order for a cabled system may include 2 cabled segments, each cabled segment including 8 cables, each cable including 16 spans, each span including 5 constituents, wherein the constituents are individual reels of optical fiber. However, because of the number of different customer requirements and their stringency, many optical fiber reels fail to individually meet all of the customer requirements. By judiciously selecting optical fiber reels for use in a span, cable, or cabled segment, optical specifications can be tightened, thus, increasing a guardband and reducing variability at the span, cable and/or cabled segment level. The selection of the fibers may be done to meet specified optical parameters to enable fabrication of a span, cable, or cabled segment with specific parameters for a standardized application, rather than for a specific customized customer order.

The selection of optical fiber reels from inventory for use in a submarine application, to fill a customer order, has typically been accomplished by two methods. A first method has been to manually select optical fiber reels from a spreadsheet (which contains various optical parameters on each optical fiber reel), such that the selected optical fiber reels, when combined, meet the customer requirements. However, manually selecting optical fiber reels from a spreadsheet is labor intensive, time consuming, seldom optimizes the optical parameters of the combined optical fiber reels and generally fails to optimize the use of inventory. In addition, for rigorous or complex customer specifications, manual selection may not be practically possible, due to the millions if not billions of potential combinations to be considered.

Accordingly, a second method has been to select optical fiber reels from inventory using one or more computer implemented algorithms that create spans that meet customer specifications on the span level without attempting to meet or predict more rigorous upper level specifications (e.g., path specifications). However, even when computer algorithms are used, the algorithms themselves may fail to take into account various complicating factors that may arise when attempting to select optical fiber reels to fill a large or complex customer order, especially an order with rigorous customer specifications.

For example, when selected optical fiber reels are actually spliced together by a customer for implementation into a system, the measured value of one or more optical parameters may be different than predicted or theoretical value(s) when the system was originally designed (e.g., because of dispersion non-uniformity, spice losses, or environmental effects), which can shift cumulative cable, cable segment and/or path optical parameters. As a result, the requirements for cables, and/or cabled segments yet to be added to the cabled system may need revision in order for the system as a whole to meet customer or standardized requirements. In the meantime, the available inventory of optical fiber reels will have almost certainly changed since the time when the system was originally designed.

Thus, what is needed is a system and method for selecting optical fiber reels from inventory that provides the desired performance characteristics in the face of increasingly rigorous and complex customer specifications, eliminates manual selection of reels, and accounts for the possibility that actual values of optical fiber implemented into a cabled system may be different than predicted values when the system was designed, while efficiently using inventory.

SUMMARY OF THE INVENTION

The present invention is directed to a system and method for selecting optical fibers from inventory for use in a communication network. In one embodiment, the invention includes a method that includes locating a plurality of optical fiber reels located in inventory, wherein each of the optical fiber reels exhibits a plurality of optical parameters. Next, the method includes creating an internal specification of requirements to be met by optical fiber selected from inventory. Then, the method includes searching among the inventory of optical fiber reels for combinations of two or more optical fiber reels that individually do not meet the internal specification of requirements that can potentially be combined to meet the internal specification of requirements and identifying the combinations within the inventory. Next, the method includes selecting a number of the identified combinations, wherein at least one optical fiber reel in at least one of the selected combinations is identified to have an amount of optical fiber on the reel cut back such that the length of the optical fiber from the reel to be incorporated in at least one of the combinations is less than the total length of optical fiber on the reel in order for at least one of the combinations to meet the internal specification of requirements.

In one embodiment, the invention also includes a method for selecting optical fibers to create spans for use in a communication network. Initially, the method includes receiving a customer order, the customer order including customer requirements for at least a portion of a plurality of optical parameters or a standardized specification of anticipated customer requirements to be met by optical fiber selected from inventory. Next, the method includes locating a plurality of optical fiber reels located in inventory, wherein each of the optical fiber reels exhibits a plurality of optical parameters. Then, the method includes selecting a first and second collection of optical fiber reels from the inventory. Next, the method includes, for each of the first and second collections, creating an internal specification of requirements to be met by first and second groups of potential span components that are selected from each collection. Then the method includes, searching among the first and second groups of potential span components for combinations comprising at least one potential span component from the first group and at least one potential span component from the second group that can potentially be combined to meet customer requirements or standardized requirements for the span and identifying the span component combinations. Next, the method includes selecting a number spans, each span comprising an identified combination of span components that meets customer requirements or standardized requirements, wherein at least one of the selected spans comprises at least one span component that is identified to have an amount of optical fiber cut back to a reduced length.

In one embodiment, the invention further includes grouping each of a plurality of spans into a plurality of cables, wherein each cable includes a plurality of spans and each of the spans corresponds to a path in each cable. In this embodiment, the invention further includes grouping the plurality of cables into a cabled system, wherein each path in the cabled system meets customer requirements or standardized requirements. The step of grouping each of the spans into a plurality of cables first includes assigning each of a first plurality of spans to a plurality of corresponding paths in a first cable, each of the first plurality of spans having a value for least one optical parameter that is, among the spans not already assigned to the cable, farthest from the center of customer requirements or standardized requirements for the path to which each is assigned. The step of grouping each of the spans into a plurality of cables next includes assigning each of a second plurality of spans to a plurality of corresponding paths in a second cable, each of said second said plurality of spans having a value for at least one optical parameter that at least partially compensates for the value of the at least one optical parameter of each of said first plurality of spans, such that when first and second cables are optically coupled in series, each combination of spans assigned to the same path can provide a value for at least one optical parameter that is closer to the center of customer requirements or standardized requirements for that path than either of the spans in the combination individually.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numerals will be used throughout the drawings to refer to the same or like parts.

As used herein, the term "cable" refers to two or more spans of optical fiber that are bundled together and encapsulated by at least one layer of protective material. In a preferred embodiment, a cable has a length of at least 20 kilometers.

As used herein, the term "span" refers to a length of optical fiber, wherein the length of optical fiber is equal to a cable for which it is proposed to be incorporated. In a preferred embodiment, a span has a length of at least 20 kilometers. In a particularly preferred embedment, a span includes optical fiber from at least two optical fiber reels that are bridged or spliced together.

As used herein, the term "dispersion managed span" or "hybrid span" refers to a span that includes optical fiber from at least two optical fiber reels that have different optical characteristics with respect to at least one optical property. In a preferred embodiment, a dispersion managed span includes optical fiber from at least one optical fiber reel that has positive dispersion and positive dispersion slope at a given wavelength (typically 1550 nm) that is bridged or spliced together with optical fiber from at least one other optical fiber reel that has negative dispersion and negative dispersion slope at the same wavelength.

As used herein, the term "bridge fiber" means a length of optical fiber that is useable in a span between lengths of optical fiber having different optical characteristics with respect to at least one optical property. In a preferred, embodiment a bridge fiber is useable between optical fiber having positive dispersion and positive dispersion slope (positive dispersion characteristics) at a given wavelength and optical fiber having negative dispersion and negative dispersion slope (negative dispersion characteristics) at a given wavelength, preferably where the optical fiber to be bridged have substantially different mode field diameters. For example, optical fiber having negative dispersion characteristics often has a mode field diameter that is substantially less than optical fiber having positive dispersion characteristics, such as between 25% and 75% of the mode field diameter of optical fiber having positive dispersion characteristics. While not limited to any particular length, the length of a bridge fiber is preferably between 5 and 25 meters, such as between 8 and 12 meters, including about 10 meters.

As used herein, the term "span component" refers to a potential or actual portion of a span that includes optical fiber from one or more optical fiber reels. In a preferred embodiment, all of the optical fiber in a span component will have the same or similar optical characteristics with respect to at least one optical property.

As used herein, the term "path" refers to the fiber length along which light propagates along the length of one or more cables optically coupled in series. In a preferred embodiment, a path has a length of at least one cable, such as a length of at least 20 kilometers. Further preferred embodiments include paths having lengths from 20 to 15,000 kilometers, such as from 200 to 2,500 kilometers, and further such as from 500 to 1,000 kilometers.

As used herein, the term "internal specification of requirements" means a set of requirements for at least a portion of a plurality of parameters that are generated for the purpose of selecting optical fiber reels from an inventory for potential use in a communication network. In a preferred embodiment, the internal specification of requirements is generated by a computer algorithm in order to provide specifications for optical fiber reels or combinations of optical fiber reels that are to be used for components in spans (i.e., span components). For example, for dispersion managed spans, a first internal specification of requirements can be generated by a computer algorithm for span components having positive dispersion characteristics and a second internal specification of requirements can be generated for span components having negative dispersion characteristics. The internal specification of requirements can include specifications for least a portion of a plurality of optical parameters included in customer requirements, or at least a portion of a plurality of optical parameters included in a standardized specification of anticipated customer requirements. In a preferred embodiment, the internal specification of requirements additionally includes requirements for length, for example the length of a span component. In a preferred embodiment, the internal specification of requirements is a function of all levels of customer specifications, current inventory distribution, and current production requirements that, in the meantime, factors cutback reduction and/or creation of a maximum number of spans.

Embodiments of the present invention can provide for the selection of optical fiber to be implemented into a communication network in order to meet customer requirements or standardized requirements for the specific length of optical fiber to be implemented into the network. For example, when the length of optical fiber to be implemented into a network is a path, the customer requirements or standardized requirements for the path may be different than the customer requirements or standardized requirements of individual spans to be optically coupled in series in order to provide the path. For example, customer requirements or standardized requirements are often tighter or stricter for a path than they are for individual spans to be included in the path. However, preferred embodiments of the present invention can provide for the selection and creation of spans wherein each individual span meets not only span requirements but also the tighter or stricter requirements for the path for which the span is intended to be incorporated. Customer requirements or standardized requirements can include requirements for a plurality of optical parameters and may additionally include requirements for length, such as requirements for the length of a span or a path.

The plurality of optical parameters may include a maximum attenuation at a selected wavelength, a maximum attenuation while bending, a maximum difference in attenuation across a wavelength range, a zero dispersion wavelength range, a range of zero dispersion slope at the zero dispersion wavelength, and a maximum polarization mode dispersion, effective area, mode field diameter, or a combination thereof. It should be appreciated that other optical parameters can also be utilized.

Figure 1:
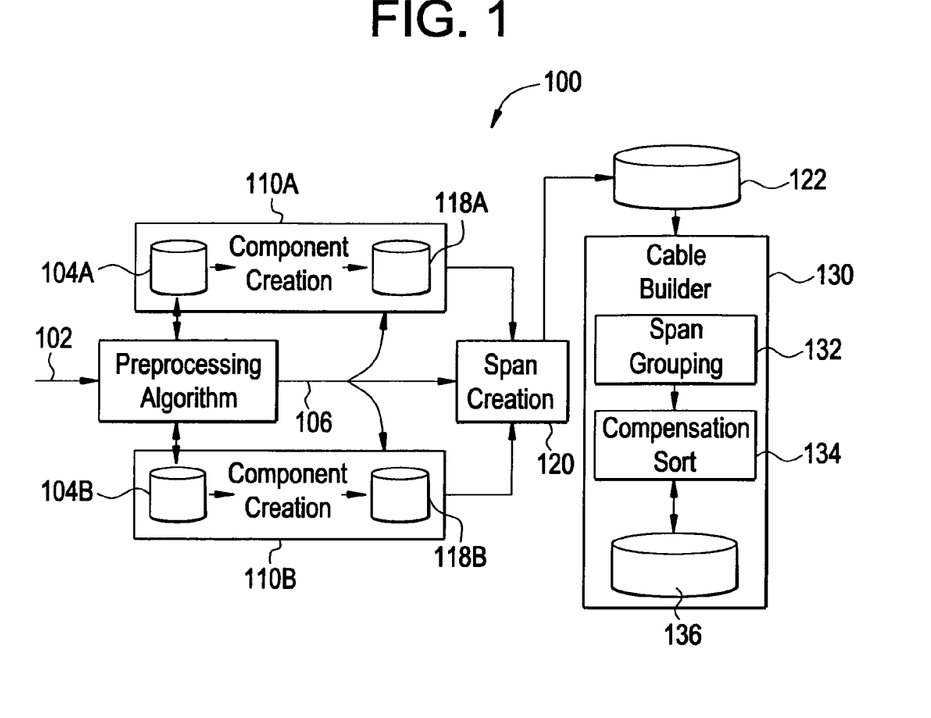
FIG. 1 is a flow diagram depicting how fiber selection routines, according to exemplary embodiments of the present invention, select optical fiber from inventory to fill a customer order that includes dispersion managed or hybrid spans.

Turning to FIG. 1, a fiber selection routine 100 according to one embodiment of the present invention is illustrated whereby dispersion managed or hybrid spans can be created from a selection of reels in an existing inventory to fill a customer order, such as an order for a dispersion managed cabled system. It will be appreciated that customer requirements or standardized requirements may be locally input directly into a computer system running the routine 100 or may be input remotely, via a computer network. It will also be appreciated that a computer system running the routine 100 will have the ability to access one or more databases containing data relating to characteristics of individual fiber reels existing in inventory.

In step 102, information relating to customer requirements and characteristics of individual fiber reels existing in inventory is sent to a preprocessing algorithm. Thereafter, optical fiber reels in inventory are separated into a first collection or group 104A (e.g., having positive dispersion characteristics) and a second collection or group 104B (e.g., having negative dispersion characteristics). The preprocessing algorithm can then, for each collection or group, calculate a distribution of the optical fiber reels in the collection or group with respect to at least a portion of a plurality of optical parameters. In a preferred embodiment, the distribution includes the mean and standard deviation of the optical fiber reels in each collection or group for at least a portion of a plurality of optical parameters.

Using this information, and in view of the customer requirements or standardized requirements (for example, customer requirements or standardized requirements for a span or customer requirements or standardized requirements for a path), the preprocessing algorithm can, in step 106, calculate internal values for a target length range for a first and second group of potential span components as well as internal values for a target length range for a first and second group of potential span components as well as internal values for a target specification for at least a portion of a plurality of optical parameters for the first and second groups of potential span components, wherein the internal values are determined as a function of the above-described distribution and customer requirements or standardized requirements.

By creating an internal specification of requirements for a first group of potential span components (e.g., having positive dispersion characteristics) and an internal specification of requirements for a second group of potential span components (e.g., having negative dispersion characteristics), first and second groups of potential span components meeting each respective internal specification of requirements can be identified, selected, and combined to create a plurality of dispersion managed spans, wherein each dispersion managed span meets a given set of customer requirements or standardized requirements. In a preferred embodiment, the internal specification(s) of requirements can enable the creation of a plurality of spans, wherein each span meets customer requirements or standardized requirements for a span proposed to be implemented into a communication network. In a further preferred embodiment, the internal specification(s) of requirements can enable the creation of a plurality of dispersion managed spans, wherein each spans meets customer requirements or standardized requirements for a path proposed to be implemented into a communication network.

Alternatively, the preprocessing algorithm can allow user to specify a desired range for the location of a bridge fiber within each dispersion managed span. The preprocessing algorithm can then determine internal specifications of requirements for potential span components, which in a preferred embodiment, include lengths of the components as well as at least a portion of a plurality of optical parameters.

Figure 1A:
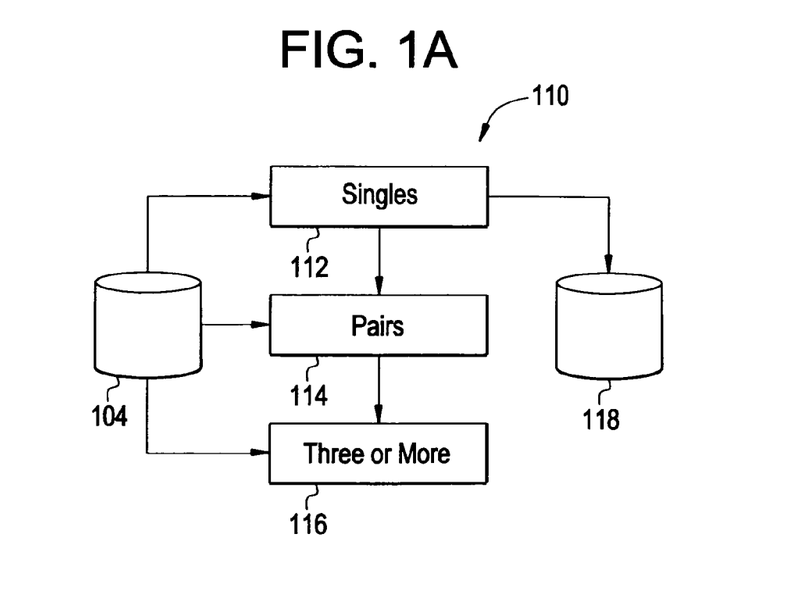
FIG. 1A is a flow diagram depicting how fiber selection routines, according to exemplary embodiments of the present invention, selects reels for each collection of span components.

Turning to FIG. 1A, a component creation routine 110 according to one embodiment of the present invention is illustrated whereby optical fiber reels or combinations of two or more optical fiber reels having the same or similar optical characteristics for at least one optical property can be selected from inventory in order to meet an internal specification of requirements. While in a preferred embodiment, component creation routine 110 is referenced in FIG. 1 (as 110A, 110B) with respect to creating two groups of span components, one from first group 104A, having positive dispersion characteristics and meeting a first internal specification of requirements, and another from second group 104B, having negative dispersion characteristics and meeting a second internal specification of requirements, component creation routine 110 can also be used for applications where the objective is the creation of hybrid spans where both groups of span components have either positive or negative dispersion characteristics. In addition, component creation routine can be used in applications where the objective is to create only one group of components, such as the creation of homogenous spans wherein all of optical fiber along the length has the same or similar optical characteristics.

In step 112, the component creation routine first searches among the available group 104 of optical fiber reels for optical fiber reels that can individually meet an internal specification of requirements and, to the extent such optical fiber reels are present in the inventory, identifying or flagging the optical fiber reels from within the inventory.

In step 114, the component creation routine searches among the inventory of remaining (not flagged) optical fiber reels for combinations of two optical fiber reels that individually cannot meet the internal specification of requirements but can potentially be reduced in length (via cutbacks) and combined to meet the component target length and other internal specification of requirements and, to the extent such combinations of two optical fiber reels are present in the inventory, identifying or flagging the combinations of two optical fiber reels from within the inventory.

In a further preferred embodiment, step 114 first projects all available combinations of pairs of optical fiber reels that can potentially be reduced in length and combined to meet the internal specification for component length. Then for each such a pair, a subroutine searches for a range of length proportions defined by the possible cutbacks, wherein such a pair can meet all internal optical specifications for the component. Because this allows each reel to be potentially paired up with many other reels, a matrix deduction algorithm can be utilized to select out combinations of two reels from all of the potential combinations. The matrix deduction algorithm can perform this task by first searching for a pair that includes a reel or reels involved in the fewest number of potential pairs, and then selecting this pair and removing reels of this pair from all other potential pairs. This process can be repeated until a desired number of pairs have been selected, such as when as many pairs as possible have been selected.

In step 116, in a preferred embodiment, the component creation routine first searches remaining (not flagged) inventory for combinations of three optical fiber reels that can potentially be reduced in length (via cutbacks) and combined to meet component target length and other component internal specification of requirements and, to the extent such combinations of three optical fiber reels are present in the inventory, identifying or flagging the combinations from within the inventory. This process is repeated until as many trios of reels as possible are identified. Following the identification of trios of optical fiber reels and to the extent unmatched optical fiber reels remain in inventory, step 116 can be repeated for combinations of four optical fiber reels, combinations of five optical fiber reels and so forth. In searching for combinations of three or more optical fiber reels, the component creation routine preferably begins by searching for the longest optical fiber reel that could be used in the combination followed by progressively shorter optical fiber reels.

In a particularly preferred embodiment, the component creation routine in step 114 and/or 116 can search and identify fiber reels in view of a "weight" assigned to each optical fiber reel located in an inventory. The "weight" of an optical fiber reel is an internally generated value that represents the degree to which the reel deviates from the center of the distribution of all of the optical fiber reels in inventory with respect to some or all of the optical parameters included in customer requirements. In a preferred embodiment, "weight" values for each optical fiber reel in inventory can be generated by calculating the square of the difference between the value of an optical parameter of a reel in inventory and the average value for that optical parameter of all of the reels in inventory, repeating this process for at least the optical parameters having a distribution in inventory that needs to be improved, and then summing these squared differences. Then, the component creation routine can identify optical fiber reels with the highest "weight" and propose that these reels be selected for combination first, leaving the optical distribution of the remaining inventory more compact.

In a preferred embodiment, the component creation routine sorts selected optical fiber or combinations of two or more optical fiber by Mode Field Diameter (MFD) in descending order in order to have a better Effective Area (EA) value and minimize splice loss.

In steps 112, 114 and/or 116, the component creation routine is capable of calculating the effect of cutting back at least a portion or amount of the optical fiber on each reel that is identified or flagged as having the capability to meet the internal specification of requirements either alone or in combination with other reels. Accordingly, optical fiber reels or combinations of two or more optical fiber reels many be selected from the identified or flagged reels or combinations, wherein at least one selected optical fiber reel is identified to have an amount of optical fiber on the reel cut back. For example, optical fiber reels or combinations of two or more optical fiber reels may be selected from the identified or flagged reels or combinations, wherein at least 75% of the individual selected reels and at least 75% of the selected combinations are identified as having optical fiber cut back, such as where at least 95% of the individual selected reels and at least 95% of the selected combinations are identified as having optical fiber cut back, and further such as where all of the selected reels, either alone or in combination are identified as having an amount of optical fiber cut back. While not limited to any specific amount, the optical fiber identified to be cut back on any selected reel can be at least 5% of the total amount of optical fiber on the reel, such as at least 10% of the total amount of optical fiber on the reel, and further such as at least 15% of the total amount of optical fiber on the reel, and even further such as at least 20% of the total amount of optical fiber on the reel. For example, the optical fiber identified to be cut back can be at least 100 meters, such as at least 200 meters, and further such as at least 300 meters and even further such as at least 1 kilometer.

By cutting back an amount of optical fiber on selected reels, individual reels or combinations of reels can be utilized as components in a communication network, for example as span components, wherein the selected reels or combinations are closer to the center of the internal specification of requirements than the reels or combinations would otherwise be without cut backs. In addition, calculating the effect of cutting back at least a portion of optical fiber can allow for the consideration of optical fiber reels that would not otherwise be considered by algorithms that do not calculate such effects.

In a preferred embodiment, the component creation routine 110 selects a plurality of potential components, for example, span components, that each have a total length that is equal to a specified length (plus or minus a specified amount). While not limited to any particular length, such specified length can be any length from 5 to 100 kilometers (±0.50 kilometers), such as any length from 5 to 100 kilometers (±0.25 kilometers), and further such as any length from 5 to 100 kilometers (±0.10 kilometers), and even further such as such as any length from 5 to 100 kilometers (±0.05 kilometers). In a preferred embodiment, this length is generated by the internal specification of requirements in view of overall customer requirements and existing inventory. By selecting a plurality of components that each have approximately the same length, components can be selected for a plurality of spans, wherein each span has the same approximate length, and, where applicable, each span has a bridge fiber in the same approximate location.

For example, a given set of customer requirements may call for the creation of a plurality of dispersion managed spans, each span having a length of 100 kilometers (±0.25 kilometers) and meeting a specification for a plurality of optical characteristics. In order to meet these requirements, and to efficiently use existing inventory, the preprocessing algorithm may calculate a target bridge position of 77 kilometers, which defines a target length for span components having positive dispersion characteristics as 77.25 kilometers (i.e., 77 kilometers plus a maximum allowable bridge position variation of 0.5 kilometers divided by two) and a target length for span components having negative dispersion characteristics of 23.25 kilometers (i.e., 100-77 kilometers plus a maximum allowable bridge position variation of 0.5 kilometers divided by two). As a result, the combined target length of both fiber components is 0.5 kilometers longer than the target span length (this 0.5 kilometer overlay provides flexibility to span creation routine 120 to find more potential spans and improve combined optical values by adjusting the final proportion of each of two fiber components involved in a span).

Referring back to FIG. 1, a span creation routine 120 according to one embodiment of the present invention is illustrated whereby first span components of optical fiber 118A (having positive dispersion characteristics) and second span components of optical fiber 118B (having negative dispersion characteristics) that were selected by the component creation routine 110 can be searched for potential combinations that can be implemented into dispersion managed spans. The span creation routine searches among the first group of span components 118A and the second group of span components 118B for combinations having at least one span component from each group that can be potentially combined to meet customer requirements or standardized requirements (such as customer requirements or standardized requirements for one or more dispersion managed spans or customer requirements or standardized requirements for a path that is intended to include a plurality of dispersion managed spans) and, to the extent such combinations of span components are found, identifying or flagging the combinations.

In a preferred embodiment, span creation routine 120 first projects all available combinations of pairs of span components that can potentially be combined to meet internal requirements for a span. For each such a pair, span creation routine 120 looks for the range of length proportions, defined by possible component length reductions, for which such a pair can meet all internal optical specifications for the component. Because this allows each span component to be potentially paired up with many other span components, a matrix deduction algorithm can be utilized to select out combinations of two span components from all of the potential combinations. In a preferred embodiment, the matrix deduction algorithm can perform this task by first searching for a pair that includes a component or components involved in the fewest number of potential pairs, and then selecting this pair as a future span and removing the components of this pair from all other potential pairs. This process can be repeated until a desired number of pairs (future spans) have been selected, such as when as many pairs as possible have been selected.

In a preferred embodiment, the span creation routine 120 can provide spans having a splice position that is as close as possible to a target splice position calculated by the preprocessing algorithm. In the case where spans include a bridge fiber, the span creation routine can preferably provide spans having a bridge fiber that is located as close as possible to a target bridge fiber position calculated by the preprocessing algorithm (or having a bridge fiber that is located as close as possible to the center of its desired location range as specified by a user). For example, in preferred embodiments, the span creation routine can provide spans having a splice position or bridge fiber that is located within 500 meters of the target position calculated by the preprocessing algorithm, such as within 50 meters of the target position calculated by the preprocessing algorithm, and further such as within 5 meters of the target position calculated by the preprocessing algorithm. In particularly preferred embodiments, the span creation routine can provide spans having a splice position or bridge fiber that is located within 1 meter of the target position calculated by the preprocessing algorithm, such as at the exact target position calculated by the preprocessing algorithm. Similarly, when a user specifies a desired location range for a bridge fiber, the range can be 500 meters or less, such as 50 meters or less, including 5 meters or less, and further including 1 meter or less.

Span creation routine 120 is capable of calculating the effect of reducing the length of the optical fiber on each potential span component that is identified as having the capability to meet internal span requirements when combined with at least one other span component. Accordingly, combinations of two or more span components many be selected from the identified or flagged span components, wherein at least one selected span component is identified to have an amount of optical fiber cut back. For example, combinations of span components may be selected from the identified or flagged span components, wherein at least 75% of the selected combinations are identified as having optical fiber cut back, such as where at least 95% of the selected combinations are identified as having optical fiber cut back, and further such as where all of the selected combinations are identified as having an amount of optical fiber cut back. For example, the optical fiber identified to be cut back can be at least 100 meters, such as at least 200 meters, and further such as at least 300 meters and even further such as at least 1 kilometer. In a preferred embodiment, optical fiber is identified to be cut back on each end of a potential span such that a bridge fiber is in the resulting span is in the same relative position as it was in the span without the proposed cutbacks.

By cutting back an amount of optical fiber on selected span components, spans can be created that are closer to the center of customer requirements or standardized requirements for a span or path. In addition, calculating the effect of cutting back at least a portion of optical fiber can allow for the consideration of span components that would not otherwise be considered by algorithms that do not calculate such effects.

In a preferred embodiment, the span creation routine 120 performs at least one additional check to insure that all potential spans meet at least a plurality of customer requirements or standardized requirements (such as customer requirements or standardized requirements for a span or path). To the extent that spans previously selected fail meet such requirements they can be excluded from the collection of spans eligible for final selection. For example, in a preferred embodiment, the span creation routine does not take into account Effective Area (EA) when identifying span components for potential combination in order to facilitate faster calculation time. Accordingly, EA can be accounted for during at least one additional check, thereby finally selecting dispersion managed spans meeting EA requirements as opposed to those that do not.

In a particularly preferred embodiment, the span creation routine 120 is capable of generating a plurality of theoretical spans that each has a total length equal to a specified length that not only meet a plurality of customer requirements or standardized requirements but also meet internal specifications for spans in a much tighter or stricter range than specified (i.e. closer to the "center" of the requirements as opposed to the upper or lower specification limits). Such selection of such spans can greatly increase the probability that a path incorporating such spans will also meet all customer requirements or standardized requirements for the path (such as a path having a length of at least two cable lengths) even when factors such as production drift, dispersion nonuniformity, and splice losses/effects are taken into account.

In a preferred embodiment, the span creation routine 120 is capable of selecting a plurality of spans that each have a total length that is equal to a specified length (plus or minus a specified amount). While not limited to any particular length, such specified length can be any length from 25 to 200 kilometers (±0.25 kilometers), such as any length from 50 to 150 kilometers (±0.25 kilometers), including, for example, 100 kilometers (±0.25 kilometers). For example, in a preferred embodiment, the span creation routine 120 is capable of selecting a plurality of spans wherein the length of each selected span is equal (±0.25 kilometers) to the length of at least 75% of every other selected span, such as where the length of each selected span is equal (±0.25 kilometers) to the length of at least 95% of every other selected span, and further such as where the length of each selected span is equal (±0.25 kilometers) to the length of every other selected span.

When such spans include a bridge fiber between a span component having positive dispersion characteristics and a span component having negative dispersion characteristics, the span creation routine 120 is capable, in a preferred embodiment, of creating a plurality of spans that each include the bridge fiber at the same distance (plus or minus a specified amount) along the length of the span. For example, in a preferred embodiment, the span creation routine 120 is capable of selecting a plurality of spans wherein the bridge fiber is located at the same distance (±0.25 kilometers) along the length of at least 75% of the selected spans, such as at least 95% of the selected spans, and further such as all of the selected spans. In a further preferred embodiment, the span creation routine 120 is capable of selecting a plurality of spans wherein a bridge fiber is located at the same distance, plus or minus 0.25 kilometers, along the length of each span in a cable.

Figure 2:
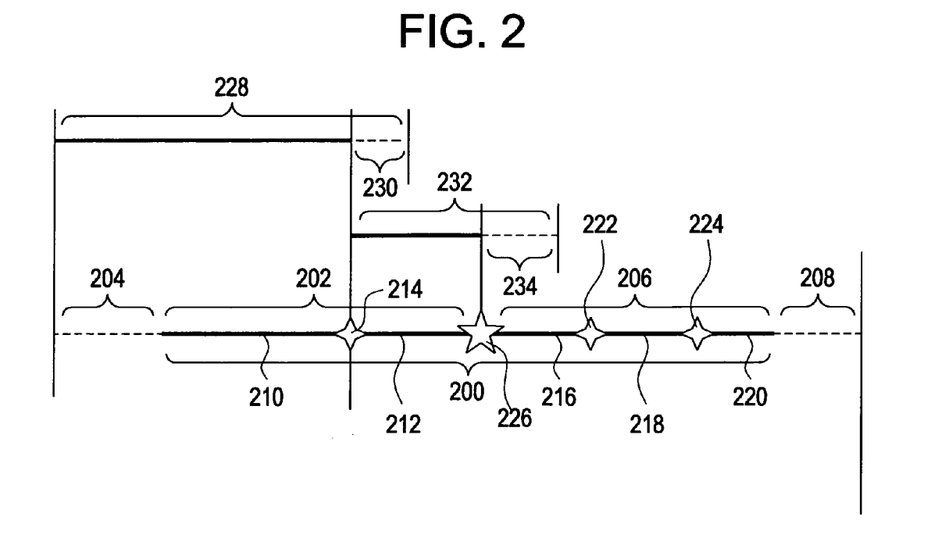
FIG. 2 is a schematic view of a dispersion managed span according to one embodiment of the present invention.

A schematic view of a dispersion managed span according to an embodiment of the present invention is illustrated in FIG. 2. Dispersion managed span 200 includes first span component 202, wherein excess length 204 is a customer allowance (proposed to be cut back later during the final physical process of cable assembly), and second span component 206, wherein excess length 208 is a customer allowance (proposed to be cut back later during the final physical process of cable assembly). First span component 202 includes optical fiber 210 and 212 from two optical fiber reels spliced together at 214 and second span component 206 includes optical fiber 216, 218, and 220 from three optical fiber reels spiced together at 222 and 224. First span component 202 and second span component 206 are in turn spliced together at 226 (alternatively, a bridge fiber (not shown) could be inserted at 226). Optical fiber 210 and 212 are in turn provided from a first optical fiber reel 228, wherein excess length 230 is proposed to be cut back during the physical span creation "splicing process", and a second optical fiber reel 232, wherein excess length 234 is proposed to be cut back during the physical span creation "splicing process".

By "proposed to be cut back" it is meant that fiber selection routine 100 merely proposes or identifies excess lengths of fiber to be cut back by a customer or end user. For example, in a preferred embodiment, fiber selection routine 100 is executed by a vendor computer program that outputs a listing of optical fiber reels to be selected from inventory as well as instructions as to how much (if any) optical fiber is to be cut back from each selected reel. The selected optical fiber reels are then shipped to customers as whole reels with instructions as to how much (if any) optical fiber is to be cut back from each selected reel. The customer or end user would then cut back the identified amounts of fiber from the selected fiber reels according to the instructions.

Referring back to FIG. 1, once a collection of potential spans 122 have been generated by the span creation routine 120, cable builder function 130 provides for the selection of an appropriate number of the spans in order to meet customer requirements or standardized requirements, such as customer requirements or standardized requirements for spans, cables, cabled segments, and paths in a cabled system. While cable builder function 130 is shown in FIG. 1 as following span creation routine, cable builder function 130 can also be used for applications where the objective is the creation of non-dispersion managed optical fiber lengths in which case cable builder function can directly follow component creation routine 110.

The cable builder function 130 can be used to fill a customer order, which may, in at least one embodiment, be a cabled system. In at least one embodiment, a cabled system can be represented as an N×M matrix, where N is the number of paths to be used in the system, M is the number of cables to be used in the system, and each element of the matrix is a span, such as a dispersion managed span. The cable builder function can include a span grouping routine 132 that groups potential spans that have been generated by the span creation routine 120 by assigning them to at least one potential cable.

In a preferred embodiment, each span in the N×M matrix will meet all customer requirements or standardized requirements for the path in which it is to be incorporated (i.e., even those spans having values for at least one optical parameter that are farthest from the center of customer requirements or standardized requirements will still be within those requirements for that parameter as well as all other specified parameters). In a particularly preferred embodiment, span grouping routine 132 selects spans to create an N×M matrix that is as close as possible to the center of the customer requirements or standardized requirements for all of the parameters included in those requirements.

Figure 3:
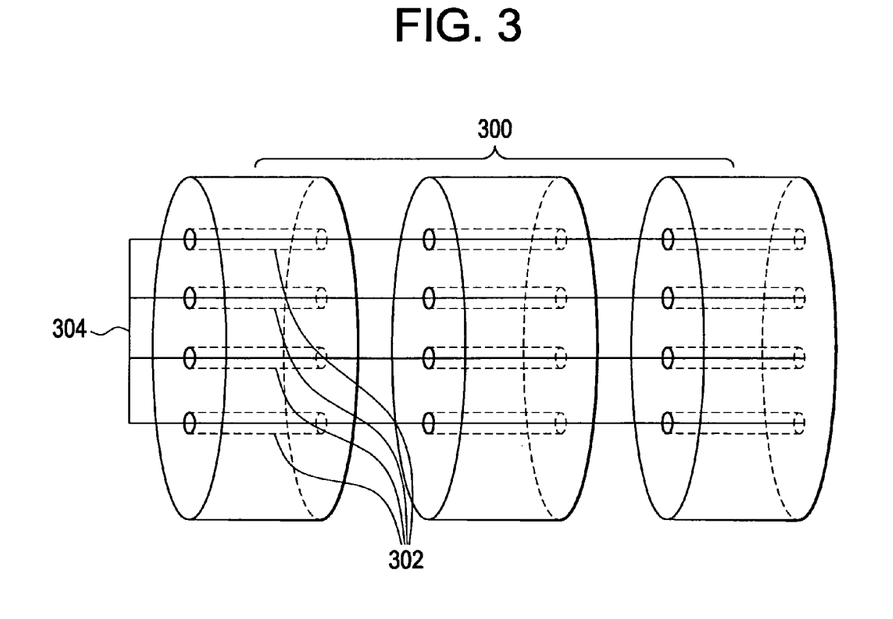
FIG. 3 is a schematic view of a set of cables, each cable including a plurality of spans wherein the spans can be optically coupled in series to provide for a plurality of paths.

A schematic view of an N×M matrix, the matrix including set of cables 300, each cable including a plurality of spans 302 that can be optically coupled in series to provide for a plurality of paths 304 is illustrated in FIG. 3.

In a preferred embodiment, a cable will include at least 4 spans, such as at least 8 spans, and further such as at least 16 spans. In a preferred embodiment, a cabled system includes at least 2 cables, such as at least 4 cables, further such as at least 8 cables, and even further such as at least 16 cables. In a preferred embodiment, the length of a cable will be between 20 and 200 kilometers, such as about 100 kilometers. In a particularly preferred embodiment, a plurality of cables can be selected, wherein each has the same length between 50 and 150 kilometers (±0.25 kilometers), such as 100 kilometers (±0.25 kilometers).

In a preferred embodiment, the span grouping routine 132 sorts an entire collection of potential spans by proposing to fill a first cable with N spans that are the farthest on one side of the distribution of potential spans with respect to at least one optical property (e.g., dispersion) in view of "differences among paths" specifications. After finding such N spans, and flagging them as components for a first potential cable, the span grouping routine 132 proposes to fill a second cable with N spans that are farthest on the opposite side of the distribution of potential spans with respect to at least one optical property. The span grouping routine 132 then continues in this manner until M cables have been filled with potential spans.

Referring back to FIG. 1, in a preferred embodiment, the cable builder function 130 further includes a compensation sort function 134 that allows for the selection of cables created by the span grouping routine 132 in order to build a cabled system 136. In some instances, the span grouping routine 132 may find more groups of potential cables than required to build a cabled system or portion thereof. In such a situation, the cable builder function 130 can allow the end user to select potential cables (or groups of cables) created by the span grouping routine 132, after which the compensation sort function can rearrange spans inside of each selected cable such that the differences in values-for one or more of a plurality of optical parameters among the paths are minimized. If the end user is dissatisfied with the projected effect of adding the selected cable(s), a different cable (or group of cables) may be selected and its projected effect to the cable system recalculated.

The fiber selection routine 100 can also utilize actual measurements from physically spliced spans, including spans that have been theoretically or physically implemented into a cable or cabled segment of a partially constructed cabled system and then the compensation sort function 134 can rearrange spans in each of the newly selected cables and can calculate the projected effect of adding selected cables (or group of cables) to the already existing or partially constructed system. For example, when a span is physically spliced, the actual measured values of one or more optical parameters of the span can be shifted and, as a result, cumulative cable or cabled segment parameters may be different from the initially predicted theoretical values. This can occur, for example, where one or more optical fibers implemented in a span have a length that is less than the total length of the optical fiber on the reel from which the span component was provided (i.e. a length of fiber on the reel has been cut back in order to provide the span component). In such case, the actual value of at least one optical property, such as dispersion characteristic(s), may be different than the predicted value due to non-uniformity along the length of the fiber. In addition, environmental effects and splice effects/losses may cause the actual value of at least one optical property to be different from the predicted value when the system was originally designed.

The fiber selection routine 100 can, if desired, create cables for an entire cabled system (assuming sufficient inventory) or just one or more cables for addition to an already existing or partially constructed system. For example, the preprocessing algorithm can generate or recalculate one or more new internal specifications of requirements for span components yet to be added to the cabled system and then, using existing inventory, select span components, spans, and cables based on these new requirements in accordance with the methods described above. This allows the network designer to repeatedly revise requirements for lengths of fiber yet to be incorporated into the network as the network is being built, and then select optical fiber from existing inventory that meets those revised requirements. In addition, it can allow the network designer to respond to customer requirements that may change during the construction of the network. In a preferred embodiment, each time a group of cables is finalized and saved, the fiber selection routine erases all potential spans not involved in the saved cables, thereby releasing previously flagged reels that are not part of saved cables.

A vendor computer system capable of executing code to perform any or all of the above-described steps can display information to a user in a textual and/or graphical form. In addition, the computer system can continually display revised information in response to user input. For example, the vendor computer system can display each of a plurality of optical fiber reels, span components, spans, paths and/or cables as a point on a chart based on the values of two selected optical parameters, wherein one of the two selected optical parameters is mapped along an ordinate of the chart and a remaining one of the two selected optical parameters is mapped along an abscissa of the chart (a three-dimensional chart, wherein values are mapped with respect to three optical parameters can also be displayed). The vendor computer system can then continually display revised output on the chart in response to user input. For example, the vendor computer system can prompt a user to input a specification of requirements or standardized specification of requirements for optical fiber lengths desired to be incorporated into a communication network. The vendor computer system can then show on the chart, only fiber reels from inventory capable of providing fiber capable of meeting the requirements, either alone or in combination. Should the user desire to broaden or narrow the requirements (such as by adding or subtracting optical parameters or by broadening or narrowing the specification limits for existing parameters), the vendor computer system can respond by showing on the chart, only fiber reels from inventory capable of providing fiber that alone or in combination meet the requirements.

A vendor computer system can also display one or more internal specifications of requirements or customer or standardized requirements as a target box on a chart. Optical fiber meeting the internal specification of requirements or customer or standardized requirements can be shown as being inside the target box and optical fiber failing to meet the internal specification of requirements or customer or standardized requirements can be shown as being outside the target box. In addition, the vendor computer system can display the effect of combining two or more amounts of optical fiber, thereby showing how individual amounts of fiber that fail to meet an internal specification of requirements or customer or standardized requirements can be combined to meet those requirements.

Figure 4:
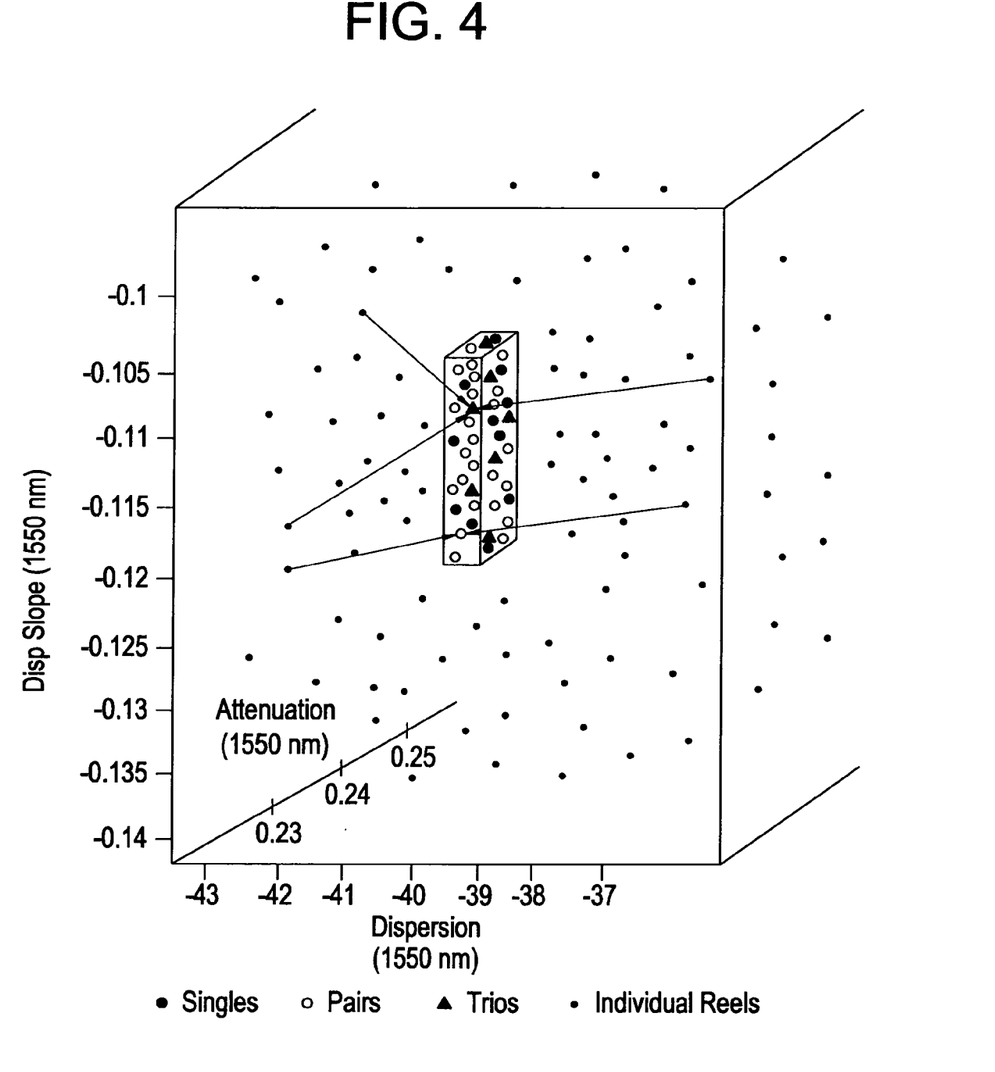
FIG. 4 is a graph depicting a distribution of optical fibers that can be combined to form potential span components.

FIG. 4 is an exemplary chart depicting a distribution of optical fiber reels, wherein deviation with respect to dispersion at 1550 nm is plotted in the x-direction, deviation with respect to dispersion slope at 1550 nm is plotted in the y-direction, and deviation with respect to attenuation at 1550 nm is plotted in the z-direction. FIG. 4, further depicts, within the chart, a target box, wherein the target box represents the specification limits of a fiber component internal specification of requirements for these parameters. Each data point shown on the chart as a solid dot outside the target box represents an individual optical fiber reel outside the specification limits. Individual optical fiber reels meeting the specification limits (for a fiber component length and optical values) are shown as solid circles inside the target box. Combinations of two optical fiber reels that individually fail to meet the specification limits but can be combined to meet the specification limits are shown on the chart as hollow circles within the target box (see arrows pointing to two optical fiber reels that can be combined together). Combinations of three optical fiber reels that individually fail to meet the specification limits but can be combined to meet the specification limits are shown on the chart as solid triangles within the target box (see arrows pointing to three optical fiber reels that can be combined together).

General Fiber Selection Routine Implementation

According to the present invention, optical fiber reels are selected from inventory so as to create an optical fiber length (such as a cable, cabled segment, or cabled system) meeting overall customer requirements for that length. In a preferred embodiment, the optical fiber length contains a plurality of dispersion managed optical fiber spans. In order for the plurality of spans to collectively meet customer requirements for the length of fiber into which they are incorporated, it is preferable that the preprocessing algorithm create an internal specification of requirements for span components.

In at least one embodiment, the following code can be utilized to create an internal specification of requirements for span components, wherein "OpticalParameter" refers to customer requirements or user specifications for a given optical parameter, "LowerLimit.Optical Parameter" refers to the lower internal specification limit for that parameter and "Upper Limit.Optical Parameter" refers to the upper internal specification limit for that parameter:

```
LowerLimit.OpticalParameter = –Infinity (initial setting)
UpperLimit.OpticalParameter = Infinity (initial setting)
If LowerLimit.OpticalParameter < OpticalParameter(Level,LowerLimit)
then
    LowerLimit.OpticalParameter = OpticalParameter(Level,
    LowerLimit)
End If
If UpperLimit.OpticalParameter > OpticalParameter(Level, UpperLimit)
then
    UpperLimit.OpticalParameter = OpticalParameter(Level, UpperLimit)
End If
```

Such code can be repeatedly implemented for each optical parameter of customer requirements or user specifications. In addition, such code can be repeatedly implemented at not only the span level but also the cable, cabled segment, and cabled system level.

In a further preferred embodiment, the preprocessing algorithm can separate optical fiber in existing inventory into a first group having positive dispersion characteristics and a second group having negative dispersion characteristics. Then for each group, the preprocessing algorithm can execute code calculating, for each optical parameter of customer requirements or user specifications, an average ("Avg") and standard deviation ("StDev") of the optical fiber in existing inventory:

Avg=CulcAvg(Collection, OpticalParameter)

StDev=CulcStDev(Collection, OpticalParameter)

In a preferred embodiment, the preprocessing algorithm can then calculate a target bridge position (or target splice position if no bridge fiber is used) for bridge fiber proposed for incorporation into a span in view of the above-calculated averages of each optical parameter. For example, the following code can be utilized to determine a target bridge position, wherein "SpanLength" is the desired length of the span based on customer requirements or user specifications and "OptParam" refers to a given optical parameter:

```
Glass1MinLength =0 (initial setting)
    MinLength(OptParam) = SpanLength *(Avg2(OptParam) –
    LowerLim(OptParam))/( Avg2(OptParam) – Avg1(OptParam))
    MaxLength(OptParam) = SpanLength *(Avg2(OptParam) –
    UpperLim(OptParam))/( Avg2(OptParam) – Avg1(OptParam))
    If Glass1MinLength < MinLength(OptParam) then
        Glass1MinLength = MinLength(OptParam)
    End If
    If Glass1MaxLength > MaxLength(OptParam) then
        Glass1MaxLength = MaxLength(OptParam)
    End If
```

This code can be repeatedly executed for each optical parameter from customer requirements or user specifications after which a target bridge position ("BridgePosition") is calculated as follows:

BridgePosition=(Glass1MaxLength+Glass1MinLength)/2

In a further preferred embodiment, internal specifications of requirements for first and second groups of span components can be calculated using the following logic, wherein "InternalMin(OptParam)" refers to a lower internal specification limit for a given optical parameter, "InternalMax(OptParam)" refers to an upper internal specification limit for a given optical parameter, "MinOtherGlassProjected" and "MaxOtherGlassProjected" refer, respectively, to projected or estimated lower and upper internal specification limits for a given optical parameter of a span component projected for incorporation into the opposite side of a span, and "StDevGlass(OptParam)" refers to the standard deviation of a group of optical fiber in inventory with respect to a given optical parameter:

```
Get MinOtherGlassProjected(OptParam, BridgePosition)
Get MaxOtherGlassProjected(OptParam, BridgePosition)
If Avg – StdDevGlass(OptParam) > MinOtherGlassProjected(OptParam)
    then InternalMin(OptParam) = Avg – StdDevGlass(OptParam)
Else
    InternalMin(OptParam) = MinOtherGlassProjected(OptParam)
End If
If Avg – StdDevGlass(OptParam) < MaxOtherGlassProjected(OptParam)
    then InternalMax(OptParam) = Avg – StdDevGlass(OptParam)
Else
    InternalMax(OptParam) = MaxOtherGlassProjected(OptParam)
End If
```

For each group of potential span components, this process can be repeated for a plurality of optical parameters and, in a preferred embodiment, will be repeated for at least all optical parameters from customer requirements or user specifications.

As discussed above, potential span components can then be identified first by searching for optical fiber reels capable of providing optical fiber that individually meets an internal specification of requirements and, to the extent such optical fiber reels are present in the inventory, identifying the optical fiber reels from within the inventory. Next, the inventory of remaining optical fiber reels can be sequentially searched for combinations of two or more optical fiber reels that individually do not meet the internal specification of requirements that can potentially be combined to meet the internal specification of requirements and, to the extent such combinations of optical fiber are present in the inventory, identifying the combinations of optical fiber reels from the within inventory. In a preferred embodiment, the inventory of remaining optical fiber reels can be first searched for combinations of pairs of optical fiber reels using a pair selecting algorithm.

In a preferred embodiment, the pair selecting algorithm, in a first step, assigns a "weight" value that accounts for of all of the optical parameters in an internal specification of requirements of each optical fiber reel in inventory as compared to the average of all optical fiber reels in inventory. For example, for each optical fiber reel in inventory, a "weight" value for each optical parameter can be calculated as follows:

Weight=0 (initial setting)

Weight+=$k$. OptParam*(Real.OptParam−Avg.OptParam)^2

Wherein "k.Optparam" denotes a relative weight factor for a given optical parameter that allows selected optical parameters to be emphasized over others, "Real.OptParam" denotes the value of an optical parameter of the optical fiber reel and "Avg.OptParam" denotes the average value for that optical parameter for all of the optical fiber reels in inventory.

This process can be repeated for all of the optical parameters in an internal specification of requirements for each optical fiber reel in inventory such that the final "weight" value represents a cumulative value for all of the desired optical parameters.

Then, the pair selecting algorithm can determine if optical fiber reels within a collection (i.e., those having positive dispersion characteristics and those having negative dispersion characteristics) are potentially combinable with other optical fiber reels within that same collection to form span components meeting an internal specification of requirements.

The following code can be utilized to select possible sets of pairs, wherein "Collection.Count" refers to the total number of optical fiber reels in each collection, "Length" refers to the target length of the relevant span component (calculated from the desired span length and the location of the target bridge position), and "MaxCutBack" and "MinCutBack" refers to the maximum and minimum allowable amount of fiber that can be cut back on each reel of optical fiber in the collection:

```
For i = 0 to Collection.Count
For j = 0 to Collection.Count
If i< >j then
    If Reel(i).length + Real(j).length < Length + 2*MaxCutBack Then
        If Reel(i).length + Real(j).length > Length + 2*MinCutBack Then
        [Run subroutine to check for existence of splice position]
            If SplicePositionExists(i, j) then
                PossibilitiesMatrix (i, j)= 1
                PossibilitiesMatrix (j, i)= 1
            End If
        End If
    End if
Next j
Next i
```

The terms "PossibilitiesMatrix(i, j)" and "PossibilitesMatrix(j, i)" denote whether a combination of two optical fiber reels from inventory are capable of providing optical fiber that may potentially be combined to meet an internal specification of requirements for span components. For example, if the 11$^{th}$ and 34$^{th}$ optical fiber reels from an inventory may potentially be so combined, then PossibilitesMatrix(11, 34) and PossibilitesMatrix(34, 11) will each be populated with "1" (as opposed to "0").

The subroutine for checking the existence of a splice position can be executed using the following logic:

```
ReaMinLength(i) =Reel.i.Length − MaxCutBack
RealMaxLength(i) = Reel.i.Length − MinCutBack
If ReaMinLength(i) < Length− Reel.j.Length+ MinCutBack then
    ReaMinLength(i) = Length− Reel.j.Length+ MinCutBack
End If
If ReaMaxLength(i) > Length− Reel.j.Length+ MaxCutBack then
    ReaMaxLength(i) = Length− Reel.j.Length+ MaxCutBack
End If
```

Next, the possible pairs of optical fiber reels are checked to determine if, when combined, they can provide a combination that meets an internal specification of optical requirements for a span component. In this regard, the following logic can be implemented for each length weighted optical parameter under consideration:

```
MinLength.OptParam = Length *( Reel.j.OptParam −
    InternalMin.OptParam)/( Reel.i.OptParam − Reel.j.OptParam)
MaxLength.OptParam = Length *( Reel.j.OptParam −
    InternalMax.OptParam)/( Reel.i.OptParam − Reel.j.OptParam)
If ReaMinLength(i) < MinLength.OptParam then
    ReaMinLength(i) = MinLength.OptParam
End If
If ReaMaxLength(i) > MaxLength.OptParam then
    ReaMaxLength(i) = MaxLength.OptParam
End If
```

Then, if ReelMinLength to ReelMaxLength range is positive and longer than a user defined tolerance value (e.g. 100 meters), then a combination of optical fiber reels in the pair is capable of meeting the internal specification of requirements for the designated optical parameters in certain range of cutbacks, and these reels can be selected in the matrix of possible pairs:

If ReaMaxLength($i$)−ReaMinLength($i$)>PositiveTolerance Then PositionExists($i,j$)=1

So to meet internal specification for the span component the final length FiberLength(i) of the first fiber in the pair has to be:

ReelMinLength($i$)<=FiberLength($i$)<=ReelMaxLength($i$)

Or for simplicity:

FiberLength($i$)=(ReelMaxLength($i$)−ReelMinLength($i$))/2

Then the length of the second fiber FiberLength(j)= Length−FiberLength(i)

Next, because the above steps allow each optical fiber reel to be potentially paired up with more than one other reel (i.e., there can be a greater number of theoretical pairs than what is physically possible), a matrix deduction algorithm can be utilized to remove selected optical fiber from all possible combinations except one. In a preferred embodiment, such matrix deduction can be performed utilizing the following logic:

```
Do while matrix empty
    ix = Find Left Column that has positive non-zero cells count
        and this count is minimum.
    jy = Find first cell in column ix with value = 1
    Save pair (ix, jx)
    Subtract reels ix and jx from Collection.
    Clear rows ix and jx from PossibilitiesMatrix.
    Clear columns ix and jx from PossibilitiesMatrix.
End Do
```

Once a number of physically combinable pairs have been selected, the amount of optical fiber, if any, to be cut back from each reel in each pair (i.e., to form optical fiber) can be calculated in order to provide one or more span components meeting the internal specification of requirements for not only span component length but also optical properties.

While the above description relates to the selection of pairs of optical fiber reels for making optical fiber span components, analogous logic can be used to select pairs of span components for making dispersion managed spans, wherein one component in the span exhibits positive dispersion characteristics and the other component in the span exhibits negative dispersion characteristics. In such spans, the analogous splice position (or bridge fiber location) is the point of intersection between the component exhibiting positive dispersion characteristics and the component exhibiting negative dispersion characteristics.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for selecting optical fibers from inventory for use in a communication network, the method comprising the steps of:
    locating a plurality of optical fiber reels located in inventory, wherein each of the optical fiber reels exhibits a plurality of optical parameters;
    creating an internal specification of requirements to be met by optical fiber selected from inventory;
    searching among the inventory of optical fiber reels for combinations of two or more optical fiber reels that individually do not meet the internal specification of requirements that can potentially be combined to meet the internal specification of requirements and identifying said combinations within the inventory; and
    selecting, using a computer, a number of the identified combinations;
    wherein at least one optical fiber reel in at least one of the selected combinations is identified to have an amount of optical fiber on the reel cut back such that the length of the optical fiber from the reel to be incorporated in at least one of said combinations is less than the total length of optical fiber on the reel in order for at least one of said combinations to meet the internal specification of requirements; and the internal specification of requirements comprises a requirement that each selected combination have a total length that is equal to a specified length plus or minus 0.5 kilometers and the amount of optical fiber identified to be cut back on a selected combination allows said combination to meet this requirement.

2. The method of claim 1, wherein each optical fiber reel in at least 75% of the selected combinations is identified to have an amount of optical fiber on the reel cut back.

3. The method of claim 1, wherein the amount of optical fiber on the reel identified to be cut back is at least 300 meters.

4. The method of claim 1, further comprising cutting the amount of optical fiber identified to be cut back.

5. The method of claim 1, wherein the specified length is from 10 to 100 *kilometers*.

6. The method of claim 1, wherein the step of searching among the inventory of optical fiber reels for combinations of two or more optical fiber reels comprises:
    identifying a collection of possible combinations of pairs of optical fiber reels that can potentially be combined to meet the internal specification of requirements; and the step of selecting a number of the identified combinations comprises:
    identifying the optical fiber reel included in the fewest possible combinations;
    selecting a combination of optical fiber reels that includes the identified optical fiber reel;
    removing combinations including said identified optical fiber reel from the collection of possible combinations; and
    repeating the above steps until a desired number of combinations are selected.

7. The method of claim 6, wherein the step of searching among the inventory of optical fiber reels for combinations of two or more optical fiber reels further comprises searching among the inventory of optical fiber reels for combinations of three or more optical fiber reels that individually do not meet the internal specification of requirements that can potentially be combined to meet the internal specification of requirements and identifying said combinations within the inventory.

8. A method for selecting optical fibers from inventory for use in a communication network, the method comprising the steps of:
    receiving a customer order, the customer order including customer requirements for at least a portion of a plurality of optical parameters or a standardized specification of anticipated customer requirements to be met by optical fiber selected from inventory;
    locating a plurality of optical fiber reels located in inventory, wherein each of the optical fiber reels exhibits a plurality of optical parameters;
    selecting, using a computer, a first and second collection of optical fiber reels from the inventory;
    for each of said first and second collections, creating an internal specification of requirements to be met by potential span components that are selected from each collection, wherein potential span components from the first collection comprise a first group of potential span components and potential span components from the second collection comprise a second group of potential span components;
    searching among the first and second groups of potential span components for combinations comprising at least one potential span component from the first group and at least one potential span component from the second group that can potentially be combined to meet customer requirements or standardized requirements for the span and identifying said span component combinations;
    selecting a number spans, each span comprising an identified combination of span components that meets customer requirements or standardized requirements;

wherein at least one of the selected spans comprises at least one span component that is identified to have an amount of optical fiber cut back to a reduced length; and the length of each selected span is equal, plus or minus 0.25 kilometers, to the length of at least 75% of every other selected span.

9. The method of claim 8 wherein the optical fiber on each reel in the first collection has positive dispersion and positive dispersion slope at a given wavelength and the optical fiber on each reel in the second collection has negative dispersion and negative dispersion slope at the same wavelength.

10. The method of claim 8, further comprising cutting the amount of optical fiber identified to be cut back.

11. The method of claim 8, wherein the customer requirements or standardized requirements comprise customer requirements or standardized requirements for a path.

12. The method of claim 8, wherein selecting each of said first group of potential span components and said second group of potential span components from each of said first and second collections comprises:

searching among each collection for individual optical fiber reels or combinations of two or more optical fiber reels that can potentially meet the internal specification of requirements for that collection and identifying said optical fiber reels or combinations of reels within the inventory; and selecting a number of the identified optical fiber reels or combinations of reels that meet the internal specification of requirements;

wherein at least one of the selected optical fiber reels is identified to have an amount of optical fiber on the reel cut back to a reduced length.

13. The method of claim 8, wherein the length of each span is at least 50 kilometers.

14. The method of claim 8, wherein each span comprises a bridge fiber between a span component having positive dispersion and positive dispersion slope at a given wavelength and a span component having negative dispersion and negative dispersion slope at the same wavelength.

15. The method of claim 14, wherein the bridge fiber is located at the same distance, plus or minus 0.25 kilometers, along the length of each span in a cable.

16. The method of claim 8, wherein, for each of said first and second collections, creating an internal specification of requirements comprises:

determining, for each collection, a distribution of the optical fiber reels in the collection with respect to at least a portion of the plurality of optical parameters; and determining internal values for:

a target length range for each of first and second groups of potential span components; and a target specification for at least a portion of a plurality of optical parameters for said first and second groups of potential span components;

wherein said internal values are determined as a function of said distribution for each collection and customer requirements or standardized requirements.

17. The method of claim 8, wherein the method further comprises:

receiving at least one measured optical parameter from at least one span that has been measured and spliced together with at least one other span; and using the at least one measured optical parameter to recalculate the requirements or specifications of at least one optical parameter for optical fiber to be added to the communication network using the at least one measured optical parameter.

18. The method of claim 8, wherein the method further comprises:

grouping each of the spans into a plurality of cables, wherein each cable comprises a plurality of spans and each of said spans corresponds to a path in each cable; and grouping the plurality of cables into a cabled system, wherein each path in the cabled system meets customer requirements or standardized requirements; and wherein the step of grouping each of the spans into a plurality of cables comprises: assigning each of a first plurality of spans to a plurality of corresponding paths in a first cable, each of said first plurality of spans having a value for least one optical parameter that is, among the spans not already assigned to the cable, farthest from the center of customer requirements or standardized requirements for the path to which each is assigned; and assigning each of a second plurality of spans to a plurality of corresponding paths in a second cable, each of said second said plurality of spans having a value for at least one optical parameter that at least partially compensates for the value of the at least one optical parameter of each of said first plurality of spans, such that when first and second cables are optically coupled in series, each combination of spans assigned to the same path can provide a value for at least one optical parameter that is closer to the center of customer requirements or standardized requirements for that path than either of the spans in the combination individually.

* * * * *